Patented Mar. 23, 1937

2,074,880

UNITED STATES PATENT OFFICE 2,074,880

MOLECULAR ADDITION COMPOUND OF CALCIUM SULPHATE AND UREA

Colin W. Whittaker and Frank O. Lundstrom, Washington, D. C., dedicated to the free use of the Public in the United States of America No Drawing. Application March 20, 1935, Serial No. 11,968

1 Claim. (Cl. 260—125)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to us of any royalty thereon.

We hereby dedicate the invention herein described to the free use of the Public in the territory of the United States of America to take effect upon the granting of a patent to us.

The present invention relates to a new composition of matter consisting of a molecular addition compound of calcium sulphate and urea.

Calcium sulphate ordinarily crystallizes as the dihydrate in which form it occurs widely in nature. This form is generally known as gypsum. Gypsum or calcium sulphate dihydrate has little value as a fertilizer since it contains none of the important plant food elements. It is however frequently used as a soil conditioner and is an important constituent of the common fertilizer material known as superphosphate.

We have found that calcium sulphate forms an addition compound with urea. In the formation of this compound the urea displaces the water of crystallization, if gypsum is used, and combines with the calcium sulphate in the ratio of one molecule of calcium sulphate to four molecules of urea. The resulting compound has the chemical formula $CaSO_4.4CO(NH_2)_2$.

The urea in the $CaSO_4.4CO(NH_2)_2$ molecule is dissolved readily by water but only slowly by 95 per cent alcohol; hence the crystals may be freed of mother liquor by rapidly washing with alcohol. On gentle heating over a free flame urea is volatilized from the compound without fusion. The compound is less hygroscopic than urea itself. It can be dried at 100° without perceptible loss of urea if the heating is not too prolonged. The crystals have a density of 1.8006 and were found by Hendricks (J. Phys. Chem. 37, No. 9, December, 1933) to be triclinic, pinacoidal, and optically negative. The refractive indices at 25° C. for the sodium D line are $\alpha=1.523$, $\beta=1.583$, and $\gamma=1.615$.

In forming the compound $CaSO_4.4CO(NH_2)_2$ from gypsum and urea the valueless water of crystallization of the gypsum is replaced by urea which contains 46.7% of the valuable plant food, nitrogen, in readily available form. Since $CaSO_4.4CO(NH_2)_2$ is less hygroscopic than urea it is less likely to become sticky when exposed to humid atmospheres. Regular crystals of this compound are readily obtained and can be used directly as a fertilizer, or for other purposes without grinding or other treatment.

In preparing our novel compound we preferably saturate water with urea, add an excess of solid urea and a quantity of ground gypsum obtained from any source, or a quantity of small gypsum crystals. The urea will displace the water of crystallization of the gypsum and combine to form the compound $CaSO_4.4CO(NH_2)_2$.

The compound may also be prepared by intimately mixing finely ground urea and gypsum. The water of crystallization will be liberated and the compound formed. The reaction proceeds more rapidly if the mixture is spread in a thin layer in a well ventilated place.

In the following we give specific examples of two procedures for the preparation of $CaSO_4.4CO(NH_2)_2$ within the scope of our invention.

*Example 1.*—Place 172 pounds of ground gypsum or of small gypsum crystals and 250 pounds of urea in a suitable container and add sufficient saturated aqueous urea solution to make a thin slurry. Allow to stand, with occasional stirring, until all of the gypsum has been converted into $CaSO_4.4CO(NH_2)_2$. This is readily determined by examination of the solid phase since the crystals of $CaSO_4.4CO(NH_2)_2$ differ greatly in appearance from either the urea crystals or the gypsum crystals. It is advantageous to carry out the reaction at constant temperature when using the saturated urea solution since slight cooling of such a solution causes crystallization of excess urea which contaminates the product. The urea solution can be reused repeatedly.

When the reaction is complete the crystals are readily separated by filtration and air dried or if desired they may be washed lightly with alcohol to remove excess mother liquor. The proportions stated here are not critical, it is merely necessary to supply sufficient urea to react with all of the gypsum present. The use of a strong urea solution is necessary since the compound is unstable in the presence of the more dilute solutions. When the reaction is carried out in the presence of a saturated urea solution the excess solid urea added disappears as $CaSO_4.4CO(NH_2)_2$ is formed.

*Example 2.*—Intimately mix 172 pounds of finely ground gypsum and 240 pounds of finely ground urea. Spread in a thin layer and allow to stand in a well ventilated room. The urea will displace the water of crystallization of the gypsum and form the compound $$CaSO_4.4CO(NH_2)_2.$$

Gentle heating will accelerate the reaction but a temperature of 60° C. should not be exceeded. This procedure does not produce well formed crystals but a slightly caked solid which is readily broken up.

We claim:

The process of producing $CaSO_4.4CO(NH_2)_2$ which comprises reacting mixtures consistsing of calcium sulphate dihydrate and urea in a saturated aqueous urea solution.

COLIN W. WHITTAKER.
FRANK O. LUNDSTROM.